(12) United States Patent
Yamaashi et al.

(10) Patent No.: US 6,437,732 B1
(45) Date of Patent: Aug. 20, 2002

(54) INFORMATION TERMINAL WITH POSITIONING FUNCTION, POSITIONING SYSTEM, METHOD OF POSITIONING, STORAGE MEDIUM, AND COMPUTER PROGRAM PRODUCT

(75) Inventors: Kimiya Yamaashi, Hitachinaka; Hiroshi Kuroda, Hitachi; Toru Yamada, Yokohama; Takaharu Ishida, Hitachinaka, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/793,888

(22) Filed: Feb. 28, 2001

(30) Foreign Application Priority Data

Aug. 31, 2000 (JP) ........................................ 2000-268372

(51) Int. Cl.[7] ............................................. H04B 7/185
(52) U.S. Cl. ............................ 342/357.01; 342/357.08; 342/458
(58) Field of Search ..................... 342/357.01, 357.06, 342/357.08, 457, 458; 701/213; 455/12.1

(56) References Cited

U.S. PATENT DOCUMENTS

| | | | | | |
|---|---|---|---|---|---|
| 4,918,609 A | * | 4/1990 | Yamawaki | ................... | 364/449 |
| 5,402,424 A | * | 3/1995 | Kou | ........................... | 370/95.3 |
| 5,510,801 A | * | 4/1996 | Engelbrecht et al. | ....... | 342/457 |
| 5,598,166 A | * | 1/1997 | Ishikawa et al. | ............ | 342/357 |
| 6,081,691 A | * | 6/2000 | Renard et al. | ............. | 455/12.1 |

* cited by examiner

Primary Examiner—Dao Phan
(74) Attorney, Agent, or Firm—Antonelli, Terry, Stout & Kraus, LLP

(57) ABSTRACT

From a single transmitted from a satellite, are extracted a position where a terrestrial station side system exists and a position of the satellite. A distance between the terrestrial station side system and the satellite, based on a difference of those positions. Then, a sum of the distance between the terrestrial station side system and the satellite and a distance between the satellite and a mobile station side system, based on a difference between the reception time when a mobile station side communication antenna receives the signal and the transmission time. Further, the distance between the mobile station side system and the satellite is obtained by subtracting the distance between the terrestrial station side system and the satellite from the obtained sum. And, based on the distance between the mobile station side system and the satellite, the position where the mobile station side system exists is obtained.

25 Claims, 16 Drawing Sheets

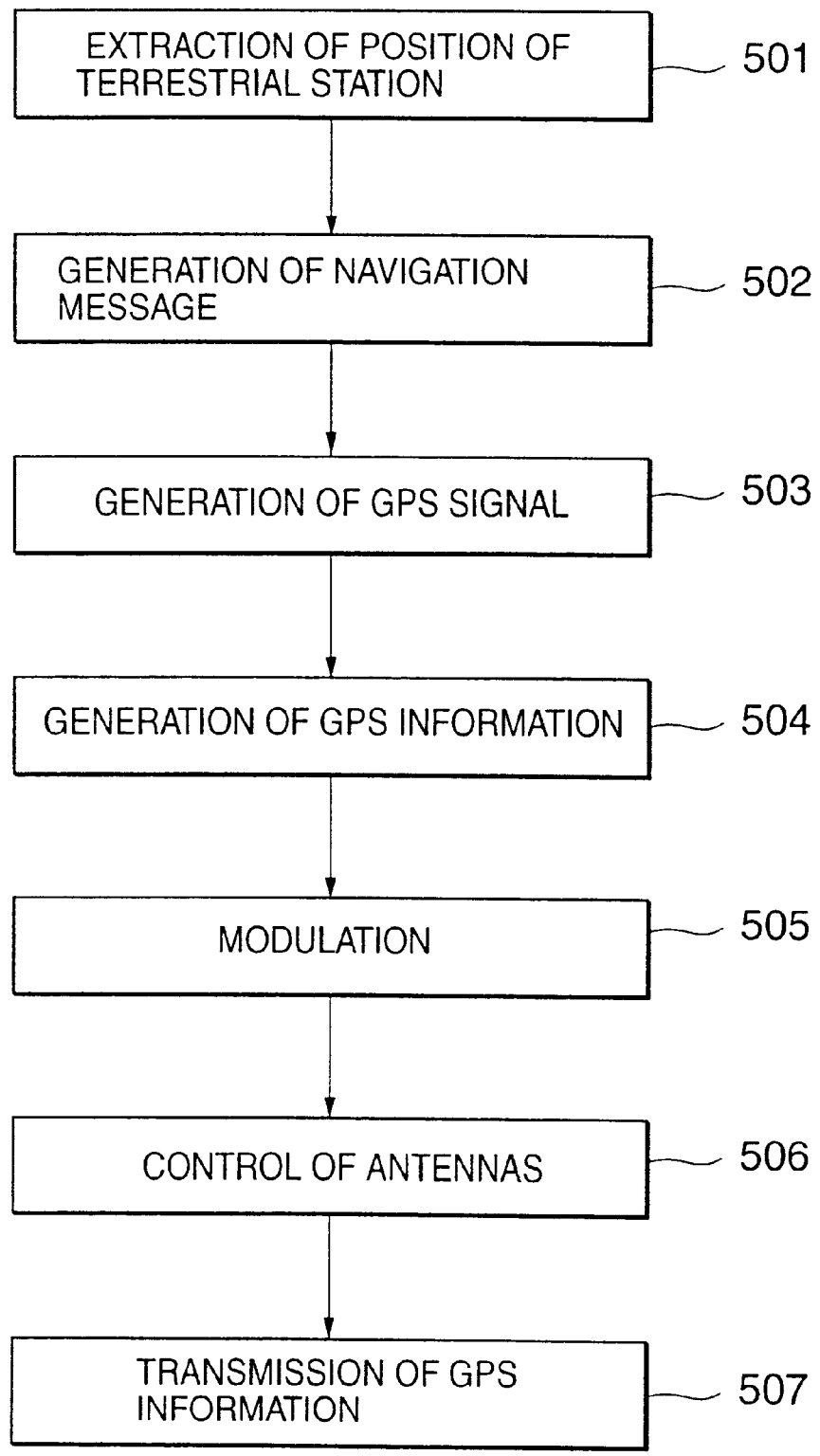

FIG.6

```
MESSAGE HEADER (32)
MESSAGE TYPE (8: NAVIGATION MESSAGE)
ITS OWN SATELLITE NUMBER (8)
ITS OWN SATELLITE'S ORBIT POSITION (256)
ITS OWN SATELLITE'S CLOCK CORRECTION INFORMATION (256)
POSITION OF TERRESTRIAL STATION (256)
THE NUMBER OF SATELLITES (8)
FOR (EACH SATELLITE NUMBER) {
    SATELLITE NUMBER (8)
    SATELLITE ORBIT INFORMATION (256)
    DISTANCE BETWEEN SATELLITE AND TERRESTRIAL STATION (256)
    HEALTH CONDITIONS (8)
}
```

FIG.9

| TIME | FOUR HEO (6 HOURS) | FIVE HEO (5 HOURS) | SIX HEO (4 HOURS) | FOUR HEO +NSTAR | THREE HEO +NSTAR |
|---|---|---|---|---|---|
| 0 | 5.1 | 6.5 | 8.3 | 5.8 | 7.4 |
| 1 | 7.4 | 7.1 | 7.0 | 5.0 | 7.6 |
| 2 | 14.4 | 8.5 | 8.0 | 6.8 | 8.8 |
| 3 | 375.8 | 7.0 | 7.0 | 7.6 | 10.0 |
| 4 | 13.4 | 6.6 | 6.3 | 7.0 | 10.8 |
| 5 | 7.3 | 7.0 | 7.0 | 6.5 | 10.9 |
| 6 | 6.1 | 8.2 | 8.0 | 5.8 | 10.0 |
| 7 | 7.4 | 8.4 | 7.0 | 6.0 | 8.4 |
| 8 | 14.4 | 8.7 | 6.3 | 6.8 | 7.4 |
| 9 | 375.8 | 7.4 | 7.0 | 7.6 | 7.6 |
| 10 | 13.4 | 7.4 | 8.0 | 7.0 | 8.8 |
| 11 | 7.3 | 9.4 | 7.0 | 6.5 | 10.0 |
| 12 | 8.1 | 8.8 | 6.3 | 5.8 | 10.8 |
| 13 | 7.4 | 6.6 | 7.0 | 6.0 | 10.9 |
| 14 | 14.4 | 6.4 | 8.0 | 6.8 | 10.0 |
| 15 | 375.8 | 8.6 | 7.0 | 7.6 | 8.4 |
| 16 | 13.4 | 9.5 | 6.3 | 7.0 | 7.4 |
| 17 | 7.3 | 9.2 | 7.0 | 6.5 | 7.6 |
| 18 | 5.1 | 7.3 | 8.0 | 5.8 | 8.8 |
| 19 | 7.4 | 6.3 | 7.0 | 6.0 | 10.0 |
| 20 | 14.4 | 6.7 | 6.3 | 6.8 | 10.8 |
| 21 | 375.8 | 9.0 | 7.0 | 7.6 | 10.9 |
| 22 | 13.4 | 8.1 | 8.0 | 7.0 | 10.0 |
| 23 | 7.3 | 7.0 | 7.0 | 8.5 | 8.4 |

INITIAL CONDITION
1. FOUR HEO SATELLITES: POSITIONS AT 0000, 0600, 1200, 1800 HOURS
2. FIVE HEO SATELLITES: POSITIONS AT 0000, 0500, 1000, 1500, 2000 HOURS
3. SIX HEO SATELLITES: POSITIONS AT 0000, 0400, 0800, 1200, 1600, 2000 HOURS
4. FOUR HEO SATELLITES (POSITIONS AT 0000, 0600, 1200, 1800 HOURS) ADDED WITH A GEOSTATIONARY SATELLITE NSTAR (AZIMUTH 186.4, ELEVATION 48.4)
5. THREE HEO SATELLITES (0000, 0800, 1600 HOURS) +NSTAR

FIG.10

| SATELLITE POSITION (ONE HOUR INTERVALS) | AZIMUTH FROM TOKYO | ELEVATION FROM TOKYO | DISTANCE FROM TOKYO |
|---|---|---|---|
| 0 | 183.967 | 0.674 | 32599 |
| 1 | 171.851 | 4.599 | 32657 |
| 2 | 162.063 | 13.527 | 33070 |
| 3 | 155.241 | 25.495 | 33876 |
| 4 | 151.037 | 38.627 | 35061 |
| 5 | 148.797 | 61.579 | 36546 |
| 6 | 147.657 | 63.523 | 38206 |
| 7 | 147.489 | 73.991 | 39897 |
| 8 | 146.087 | 82.728 | 41479 |
| 9 | 94.559 | 89.347 | 42833 |
| 10 | 338.701 | 85.328 | 43664 |
| 11 | 335.149 | 82.224 | 44505 |
| 12 | 330.64 | 80.657 | 44720 |
| 13 | 320.534 | 80.831 | 44498 |
| 14 | 299.806 | 81.043 | 43860 |
| 15 | 271.181 | 79.305 | 42851 |
| 16 | 249.644 | 74.205 | 41542 |
| 17 | 237.946 | 66.255 | 40028 |
| 18 | 231.268 | 56.214 | 38423 |
| 19 | 226.361 | 44.675 | 38850 |
| 20 | 221.398 | 32.308 | 35429 |
| 21 | 215.143 | 20.09 | 34256 |
| 22 | 206.588 | 9.487 | 33388 |
| 23 | 195.715 | 2.432 | 32837 |

FIG.16

```
MESSAGE HEADER (32)
MESSAGE TYPE (8: DPS INFORMATION)
THE NUMBER OF REFERENCE STATIONS (8)
FOR (THE NUMBER OF REFERENCE STATIONS) {
REFERENCE STATION IDENTIFICATION NUMBER (8)
REFERENCE STATION POSITION INFORMATION (256)
THE NUMBER OF SATELLITES (8)
FOR (EACH SATELLITE) {
    SATELLITE NUMBER (8)
    PSEUDO DISTANCE CORRECTION VALUE (256)
    DISTANCE CHANGE RATE CORRECTION VALUE (256)
    DATA ISSUE NUMBER (24)
    }
}
```

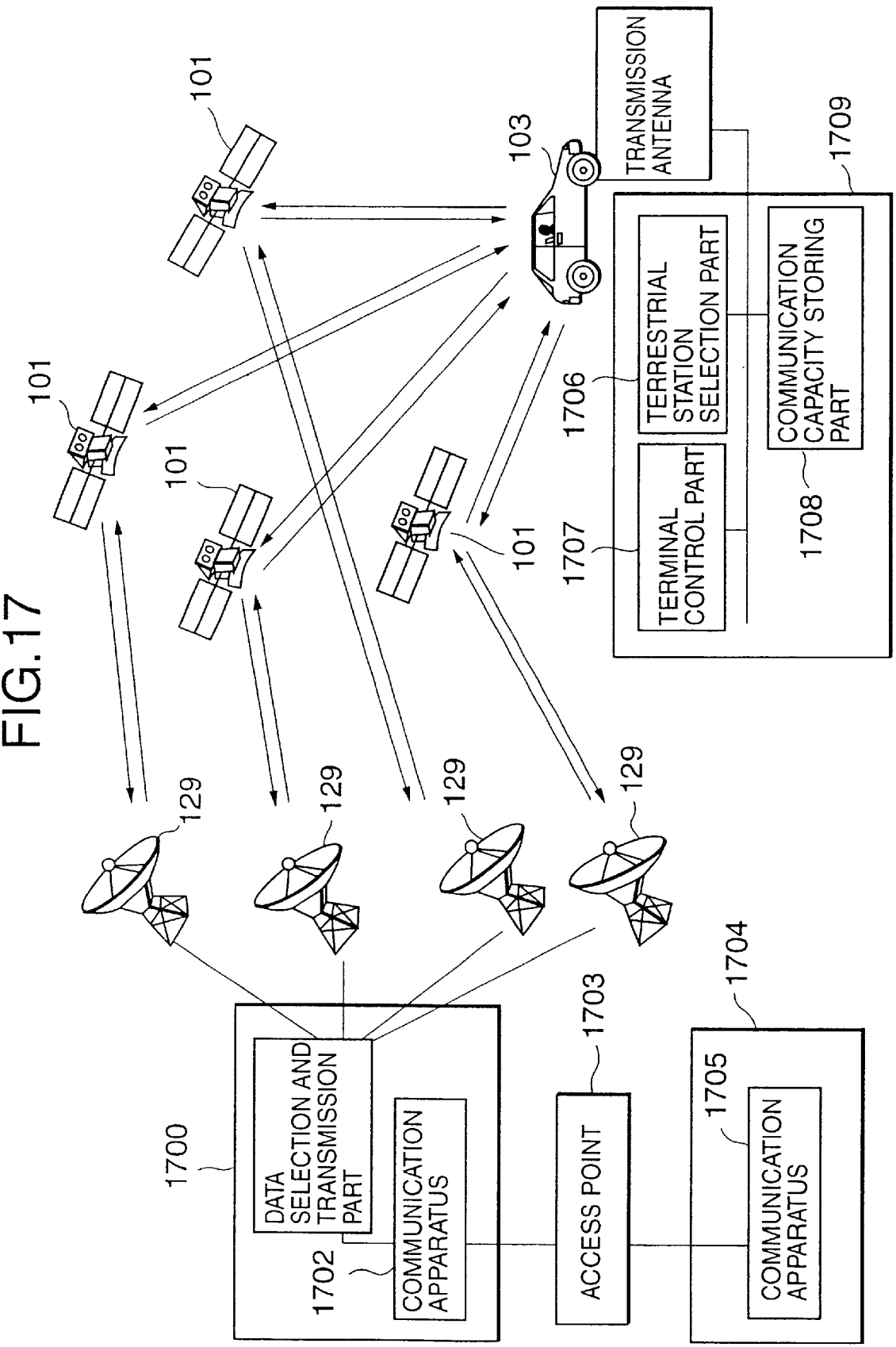

INFORMATION TERMINAL WITH POSITIONING FUNCTION, POSITIONING SYSTEM, METHOD OF POSITIONING, STORAGE MEDIUM, AND COMPUTER PROGRAM PRODUCT

This application is based on Japanese Patent Application No. 2000-268372 filed in Japan, the contents of which are incorporated hereinto by reference.

BACKGROUND OF THE INVENTION

1. Field of the Invention

The present invention relates to a positioning technique for using a signal transmitted from an artificial satellite to measure a position of an information terminal provided to a mobile station side system.

2. Related Art Statement

Japanese Patent Laid-Open No. 11-34996 describes a positioning technique using a non-geostationary general-purpose satellite that moves on a long elliptical orbit and can provide services without being affected by landforms and shadows by building arrangement within a specific service area (for example, the area of a certain country, such as the whole of Japan including isolated islands and the range of territorial waters) (hereinafter, referred to as a quasi-zenithal satellite), wherein the satellite is provided with a communication system, goes around on the elliptical orbit in a 24-hour cycle, and is used for the positioning in the range of orbit inclination of more than or equal to 37 degrees and less than or equal to 44 degrees and in the range of eccentricity of more than or equal to 0.24 and less than or equal to 0.35 (hereinafter, referred to as an "HEO satellite").

A method of detecting a position by a navigation apparatus utilizing a non-geostationary general-purpose satellite is described in Japanese Unexamined Patent Laid-Open No. 10-48310. According to the detection method of 10-48310, a terrestrial station concerned transmits an RF signal to a user station through a forward link (satellite communication), and conversely, the user station replies to the terrestrial station through a return link (satellite communication). Then, based on the round-trip propagation time of this communication, the range between the terrestrial station and the user terminal (the sum of the distance between the terrestrial station and the non-geostationary general-purpose satellite and the distance between the geostationary general-purpose satellite and the user terminal) is calculated. Further, based on thus-calculated range and a known range between the geostationary general-purpose satellite and the terrestrial station, the user station performs positioning calculation of the range between the satellite and the user terminal. Further, this positioning calculation is performed based on the solutions by respective Doppler effects generated between the terrestrial station concerned and the satellite and between the satellite and the user station, and based on the above-calculated range.

Further, Japanese patent Laid-Open No. 8-331033 describes positioning utilizing elliptical orbit communication satellites. In particular, its paragraph 0081 describes calculation of distance between a communication satellite and a mobile station by obtaining a difference between a radio wave propagation time of a radio channel making a round trip between a satellite communication fixed station and a mobile station through the communication satellite and a radio wave propagation time of a radio channel making a round trip between the satellite communication fixed station and the communication satellite, and by multiplying the obtained difference by the radio wave propagation velocity. Further, the paragraph 0084 of the same document describes that received field strengths of radio channels between a satellite communication fixed station or a ground communication terrestrial station and a mobile station are obtained, and a radio channel having the largest received field strength among those radio channels is selected, and the selected channel is used to connect a communication line.

In the positioning method described in 11-34996, an HEO satellite, which is quasi-zenithal, is used for positioning. However, it does not describe what positioning method is favorable. In particular, it does not consider making Geometrical Dilution Of Precision (GDOP), which expresses the positioning precision, less than or equal to 10 (less than or equal to 11 or 9, when an error of 10% for the GDOP value 10 is included) at all.

Further, the positioning method described in 10-48310 utilizes general-purpose non-geostationary satellites. However, communication is performed bilaterally (forward link and return link) between a terrestrial station concerned and a user station through a satellite, and the terrestrial station concerned performs positioning calculation. Accordingly, the terrestrial station must perform transmissions and receptions four times, in order to perform positioning calculation. Further, in order that the user station itself can know its position, it must perform transmission and reception, further. In other words, reduction of positioning time including times for transmissions and receptions is not taken into consideration.

Considering the environment of the present communication system that the communication capacity is 2 MBPS or less while there are millions of users of information terminals having a positioning function such as car navigation terminals, it is difficult that the mentioned positioning method ensures the real time property of positioning in, for example, a car navigation system. Further, this conventional technique also does not consider how GDOP, which expresses a positioning precision, can be made not more than 10, at all.

Further, as described above, the positioning method of 8-331033 obtains a distance between a satellite communication fixed station and a communication satellite based on a radio wave propagation time of a radio channel that makes a round trip between the satellite communication fixed station and the communication satellite. Thus, it does not consider a delay error of radio wave propagation generated in the ionosphere when a radio channel makes a round trip between the satellite communication fixed station and the communication satellite, and an error of radio wave propagation time generated between a clock provided in the satellite communication fixed station and a clock provided in the communication satellite. In other words, it does not consider high precision positioning that suppresses effects of a radio channel making a round trip between the satellite communication fixed station and the communication satellite on radio wave propagation. In particular, it does not consider making GDOP not more than 10, at all.

Further, as described above, the conventional positioning methods do not considere making GDOP (Geometrical Dilution Of Precision) not more than 10, though it is necessary to make GDOP less than or equal to 10 as described in "GPS", p. 135 (published by Japanese Association of Surveyors on Nov. 5, 1989). In other words, the conventional methods do not consider what operating conditions can make GDOP less than or equal to 10 when a quasi-zenithal satellite (in particular, an HEO satellite) is used for positioning.

Further, when there are a plurality of terrestrial station side systems, a terrestrial station through which connection with a telecommunication business is established is not selected in consideration of reduction of communication time and communication cost between the telecommunication business and the terrestrial station side system.

SUMMARY OF THE INVENTION

An object of the present invention is to provide an information terminal and positioning system having a positioning function that ensures a high positioning precision in a short time.

Another object of the present invention is to make CGOP, which is an index of positioning precision, less than or equal to 10, in particular, in positioning utilizing quasi-zenithal satellites (particularly, HEO satellites).

Further, another object of the present invention is to reduce a communication time and communication cost in providing Internet connection service through satellites.

The present invention provides a positioning system provided with:

(1) a terrestrial station side system comprising: a terrestrial station side satellite communication antenna for transmitting a signal to a satellite; and a terrestrial station side communication apparatus for transmitting a signal to the terrestrial station side satellite communication antenna;

(2) the satellite having a satellite side satellite communication antenna for transmission and reception to and from the ground; and (3) a mobile station side system comprising: a mobile station side satellite communication antenna for receiving the signal from the satellite; and an information terminal for measuring a position where the mobile station side system exists, based on the signal received through the mobile station side satellite communication antenna.

Further, the present invention provides: a positioning method used for the positioning system of the present invention; an information terminal (including a portable terminal) that can perform positioning using the mentioned method; a computer readable storage medium that stores a computer program for realizing the mentioned positioning method; and a computer program product having computer readable program code means for realizing the mentioned positioning method.

The positioning method of the present invention comprises steps of:

extracting a distance between a position where a terrestrial station side system exists and a satellite, from a signal transmitted from the satellite;

extracting a transmission time from the signal transmitted from the satellite;

obtaining a sum of the distance (a) between the terrestrial station side system and the satellite and a distance (b) between the satellite and a mobile station side system;

obtaining the distance (b) between the mobile station side system and the satellite by subtracting the distance (a) between the terrestrial station side system and the satellite from the sum (a+b); and obtaining a position where the mobile station side system exists, based on the obtained distance (b) between the terrestrial station side system and the satellite.

BRIEF DESCRIPTION OF THE DRAWINGS

These and other features, objects and advantages of the present invention will become more apparent from the following description when taken in conjunction with the accompanying drawings wherein:

FIG. 5 is a flowchart showing processing included in the terrestrial station side system;

FIG. 6 shows contents of a navigation message;

FIG. 9 shows measured data of GDOP;

FIG. 10 shows position data of an HEO satellite;

FIG. 16 shows contents of DGPS information used in the system of FIG. 11;

FIG. 17 is a diagram showing an entire system configuration according to another embodiment.

Figure 1:
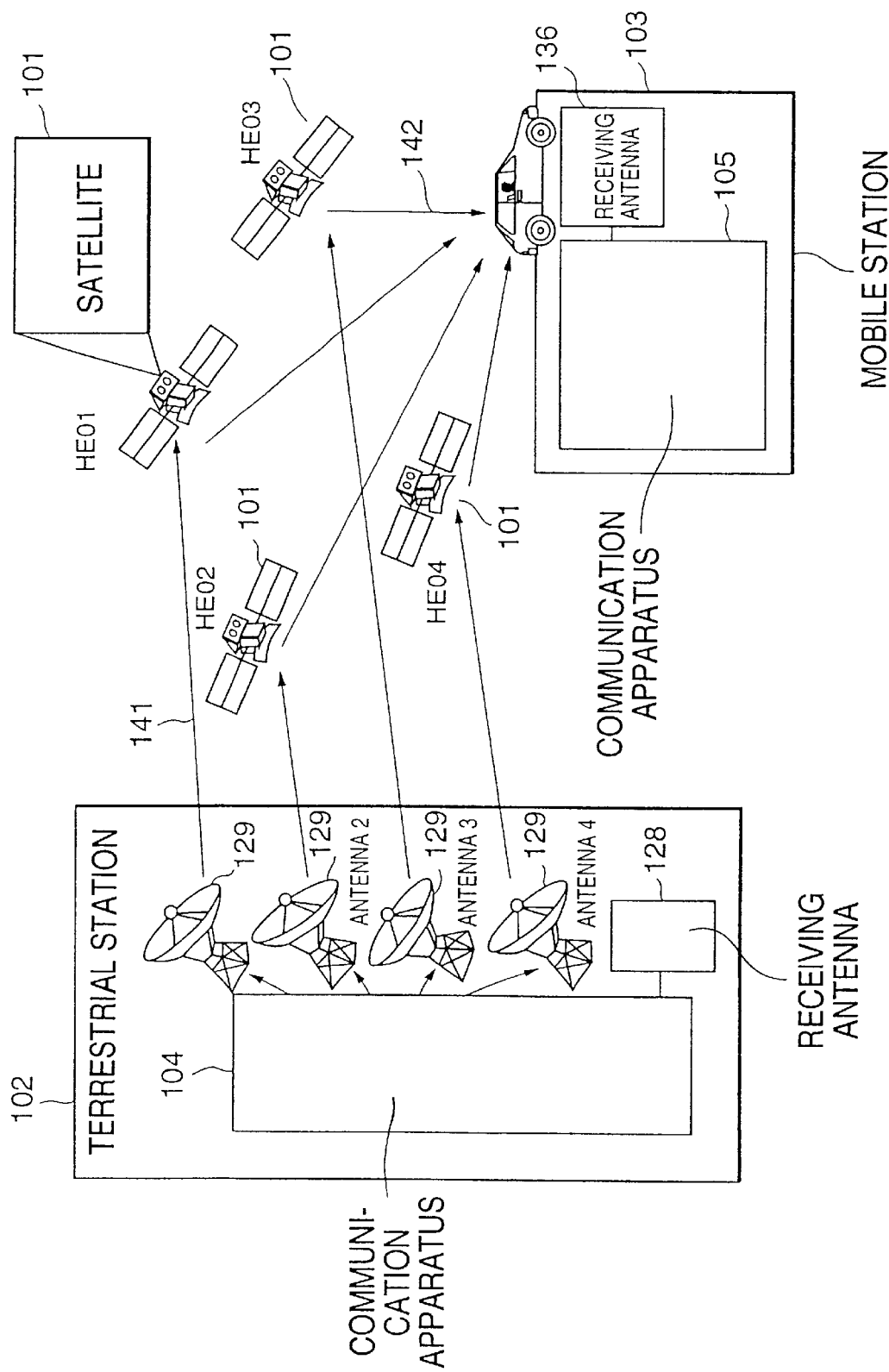
FIG. 1 is a diagram showing a configuration of a positioning system according to one embodiment of the present invention.

In each drawing, the reference numeral 101 refers to an HEO satellite; 102 to a terrestrial station side system, 103 to a mobile station side system, 105 to a terrestrial station side information terminal, 121 to a GPS information generating part, 122 to a clock information generating part, 123 to a satellite position deciding part, 124 to a terrestrial station control part, 125 to a data selection and transmission part, 126 to a terrestrial station position storing part, 127 to a data separation part, 129 to a terrestrial station side satellite communication antenna, 136 to a mobile station side satellite communication antenna, 131 to a terminal control part, 132 to a position calculation part, 133 to a data separation part, 134 to a map data storing part, 135 to a clock information generating part, 137 to a terrestrial station side position information storing part, 151 to a transmission timing calculation part, and 152 to a decode information storing part.

DETAILED DESCRIPTION OF THE INVENTION

As one mode of the present invention, can be considered a following mode.

Namely, a position of a terrestrial station side system and a position of a satellite are extracted from a signal transmitted from the satellite, and a distance between the terrestrial station side system and the satellite is obtained from a difference between those positions. Here, when the signal transmitted from the satellite includes the distance between the terrestrial station side system and the satellite, the distance is obtained directly. Next, a sum of the distance between the terrestrial station side system and the satellite and a distance between the satellite and a mobile station side system is obtained based on a difference between a reception time when a mobile station side communication antenna receives the signal and a transmission time of that signal. Then, the distance between the mobile station side system and the satellite is obtained by subtracting the distance between the terrestrial station side system and the satellite from the above-mentioned sum, and a position where the mobile station side system exists is obtained based on the distance between the mobile station side system and the satellite.

According to this mode, the distance between the terrestrial station side system and the satellite (or, the positions of the terrestrial station side system and the satellite, which can specify the distance between them) is transmitted in advance from the terrestrial station side system, and the information terminal receives that distance (or, those positions) through the satellite. Thus, positioning processing can be performed in the information terminal only, and it is possible to provide the information terminal having a real-time and highly precise positioning function.

Further, another mode of the present invention provides a positioning system comprising:

a terrestrial station side system that in turn comprises: a terrestrial station side satellite communication antenna for transmitting signals to satellites; and a communication apparatus for transmitting the signal to the terrestrial station side satellite communication antenna;

the satellites each having a satellite side satellite communication antenna for transmission and reception to and from the ground; and a mobile station side system that comprises: a mobile station side satellite communication antenna for receiving the signals from the satellites; and an information terminal for measuring a position where the mobile station side system exists, based on the signals received through the mobile station side satellite communication antenna;

wherein:

the above-mentioned satellites include three or more quasi-zenithal satellites; and the information terminal measures the position where the mobile station side system exists, based on signals received from those three or more quasi-zenithal satellite.

According to this mode, it is possible to make GDOP less than or equal to 11, and to ensure sufficient precision for positioning. Here, when five or more quasi-zenithal satellites are provided, the value of GDOP can be less than or equal to 10 even if its error is estimated as 10%, and sufficient precision for positioning can be ensured.

Further, when a constituent apparatus of a positioning system (such as an information terminal of a mobile station side system) selects a terrestrial station side system, considering communication environment (in particular, communication capacity) of a communication line between a telecommunication business, which connects a communication line for Internet or the like, and a terrestrial station side system, to connect a line with a communication apparatus of the telecommunication business, it is possible to provide comfortable communication environment such as reduced communication time to a user of the information terminal.

According to the present invention, it is possible to provide an information terminal and positioning system having a positioning function that ensures high precision in short time.

Further, according to the present invention, it is possible to provide an information terminal and positioning system having a positioning function in which GDOP as an index of positioning precision is less than or equal to 10.

THE PREFERRED EMBODIMENTS

FIG. 1 shows a positioning system according to one embodiment of the present invention.

The positioning system of the present embodiment comprises: five of the above-mentioned HEO satellites 101 (one is omitted in FIG. 1); a terrestrial station side system 102 including terrestrial station side satellite communication antennas 129 and a terrestrial station side communication apparatus 104; and a mobile station side system 103 including a mobile station side satellite communication antenna 136 and an information terminal 105.

In the terrestrial station side system 102, in order to transmit a radio wave (signal) to each HEO satellite 101, the terrestrial station side communication apparatus 104 controls the terrestrial station side satellite communication antennas 129, and performs generation of a navigation antennas 129, and performs generation of a navigation message, generation of a GPS signal by modulation of the navigation message, generation of GPS information 141 by modulation of the GPS signal, transmission of the GPS information to the terrestrial station side antennas 129, transmission of a signal including the GPS information 141 toward the space in which each HEO satellite 101 exists, and the like.

Each HEO satellite 101 receives the GPS information 141 transmitted from the terrestrial station side system 102, amplifies the GPS information 141, and thereafter transmits it towards the ground.

The mobile station side system 103 receives the GPS information 141 from each HEO satellite 101 through the receiving antenna 136, decodes the received GPS information 141 by means of the information terminal 105 to obtain the GPS signal and the navigation message, and calculates the position of the mobile station side system using the obtained GPS signal and navigation message.

Here, the terrestrial station side system 103 is used as a navigation system when it is mounted on a moving object such as an automobile moving in the environment having up-and-down geographic features, and the information terminal 105 constituting the terrestrial station side system is used as a navigation terminal.

Further, in the above description, the position of the terrestrial station side system 103 is measured. However, the information terminal 105 itself or the receiving antenna 136 itself has the almost same position as the terrestrial station side system 103, and therefore, measuring the terrestrial station side system 103 includes the case of measuring the information terminal 105 or the receiving antenna 136 also.

Further, in this specification, the GPS information 141 is a signal including a navigation message 141 and a GPS signal obtained by coding a navigation message with a pseudo-spread code of each satellite.

Next, the embodiment of the positioning system of the present invention will be described in more detail.
(1) Terrestrial Station The terrestrial station side system 102 comprises the terrestrial station side communication apparatus 104, the terrestrial station side satellite communication antennas 129 as satellite communication antennas, and the receiving antenna 128.

Figure 2:
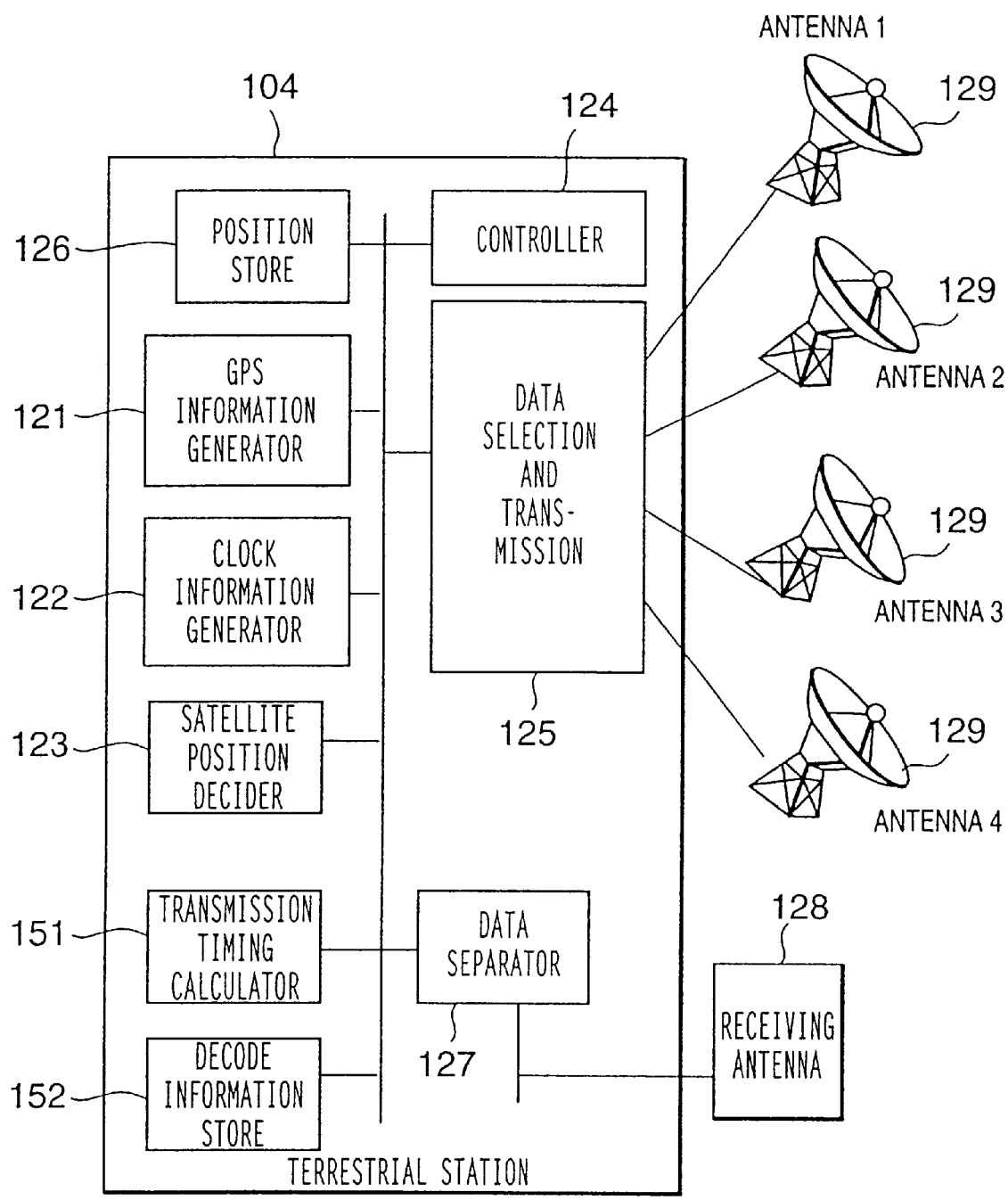
FIG. 2 is a block diagram showing a terrestrial station side system.

The configuration of the terrestrial station side communication apparatus 104 included in this terrestrial station side system 102 will be described referring to FIG. 2.

The terrestrial station side communication apparatus 104 comprises a GPS information generating part 121, a clock information generating part 122, a satellite position deciding part 123, a terrestrial station side control part 124, a data selection and transmission part 125, a terrestrial station position storing part 126, a data separation part 127, a transmission timing calculation part 151, and a decode information storing part 152.

Next, functions of each component will be described.

The terrestrial station side control part 124 controls each component so that GPS information 141 (a signal obtained by superimposing a GPS signal and a navigation message) is periodically transmitted to each HEO satellite 104.

The satellite position deciding part 123 observes the position of each HEO satellite 101 (navigation position), to obtain the position data of the observed HEO satellite. This observation uses trigonometrical survey using laser from the ground.

The clock information generating part 122 utilizes a high precision atomic clock such as a cesium clock or a rubidium clock, to generate clock information for expressing the present time.

The terrestrial station position storing part 126 stores terrestrial station position information expressing the position of the terrestrial station side system 102 itself.

The GPS information generating part 121 adds the satellite position information, which is decided by the satellite position deciding part 123, and the terrestrial station position information, which expresses the position of the terrestrial station side system and is stored by the terrestrial station position storing part 126, to the conventional navigation message including orbit information and a calendar, to generate a new navigation message as shown in FIG. 6 (this new navigation message is referred to as "navigation message" in the specification of the present invention). Then, by performing spread spectrum modulation (hereinafter, referred to simply as "modulation") with a pseudo-noise code (PN code, D/A code, and P code) that is decided in advance for each HEO satellite, the GPS signal is superimposed to the navigation message. Further, by superimposing the time (transmission time) generated by the above-mentioned clock information generating part, GPS information 141 is generated. (For example, in the case of the band of 25 M, the GPS information is generated using a pseudo-noise code of 1023 (1024−1) bits decided for each satellite as a spread code (spread spectrum modulation) with a chip rate of 12.5 Mbps, similarly to NAVSTAR).

The data selection and transmission part 125 tracks each of the plurality of HEO satellites 101, controls each terrestrial station side satellite communication antenna 129 prepared for each HEO satellite 101 to run in the direction that makes transmission toward the corresponding HEO satellite possible, and transmits the GPS information 141 toward the HEO satellites through the respective terrestrial station side satellite communication antennas 129. Further, the GPS information 141 to transmit is obtained (selected) and used for each HEO satellite 101 of the transmission destination, obtaining it from the GPS information generating part 121.

The decode information storing part 152 stores decode information used for decoding GPS information 141 from a signal received through the receiving antenna 128.

The data separation part 127 obtains the decode information from the decode information storing part 152, and separates the signal received through the receiving antenna 128 into the GPS information 141 and the other signals. Further, by despreading the GPS information 141, is obtained a GPS signal. And, by further despreading the GPS signal, is obtained a navigation message.

The transmission timing calculation part 151 holds presupposed transmission timing (time) for transmission to each HEO satellite 101. Further, from the GPS information 141 separated by the data separation part 127, the transmission timing calculation part 151 obtains the transmission time when the terrestrial station side system 102 transmitted the GPS information 141, and obtains the reception time from the clock information obtained from the clock information storing part 122. From the difference between those times, is obtained the time elapsed from the actual transmission of the GPS information 141 through the terrestrial station side communication antenna 129 of the terrestrial station side system 102 to the arrival to the ground through each HEO satellite 101. Next, based on this elapsed time, the transmission time to each HEO satellite 101 and the presupposed transmission time are compared. An average of such differences is obtained at intervals of a constant period (for example, at intervals of one hour), and a transmission time is corrected by increasing or decreasing the presupposed transmission time by this average, to obtain a transmission time that takes the ionospheric error into consideration.

Next, operation performed by the terrestrial station side apparatus 104 controlled by the terrestrial station control part 124 included in the terrestrial station side system 102 will be described referring to FIG. 5.

The terrestrial station control part 124 instructs the data selection and transmission part 125 to select an HEO satellite 101 to which GPS information 141 is transmitted, and to transmit the GPS information 141 to a terrestrial station side satellite communication antenna 129. Receiving the instruction, the data selection and transmission part 125 instructs the GPS information generating part 121 to generate GPS information 141. The GPS information generating part 121 obtains the satellite position information expressing the position of each HEO satellite from the satellite position deciding part 123, obtains the present time from the clock information generating part 122, and obtains the terrestrial station position information expressing the position of the terrestrial station side system from the terrestrial station position storing part 126 (Process 501).

The GPS information generating part 121 generates a navigation message that includes the obtained terrestrial station position information and the satellite position information from the satellite position deciding part (Process 502).

Further, the GPS information generating part 121 performs spectrum spreading on the generated message to superimpose the obtained clock information to the navigation message, and thus, to generate a GPS signal (Process 503).

Then the GPS information generating part 121 performs further spectrum spreading on the generated GPS signal to generate GPS information 141 added with an identification number for each HEO satellite 101 as a destination of transmission, and the, transmits the generated GPS information 141 to the data selection and transmission part 125 (Process 504).

Next, the data selection and transmission part 125 selects the GPS information 141 and the HEO satellite to which the GPS information 141 is transmitted, based on the identification number added to the GPS information 141, and further modulates the GPS information 141 with a predetermined frequency (Process 505).

Further, the data selection and transmission part 125 tracks each HEO satellite 101 furthermore, and controls the terrestrial station side satellite antennas 129 to turns to suitable directions so that it is possible to transmit each GPS information 141 to the HEO satellite 101 indicated by the identification number added to the GPS information 141 (Process 506).

Further, the data selection and transmission part 125 makes each controlled terrestrial station side satellite communication antenna 129 transmit the GPS information 141 for the corresponding HEO satellite at a transmission timing obtained by the transmission timing calculation part 151 (Process 507).

The navigation message generated in Process 502 according to the present invention is shown in FIG. 6.

As shown in the figure, the navigation message includes both the terrestrial station position information expressing the position of the terrestrial station and the position information of the HEO satellite 101, or distance information expressing a distance between the terrestrial station and the HEO satellite 101, in addition to the conventional navigation message. Since the GPS information 141 includes the time information of the transmission timing (transmission time information), and an information terminal uses those pieces of information in the positioning calculation, the real time property and high precision positioning is realized.

Figure 7:
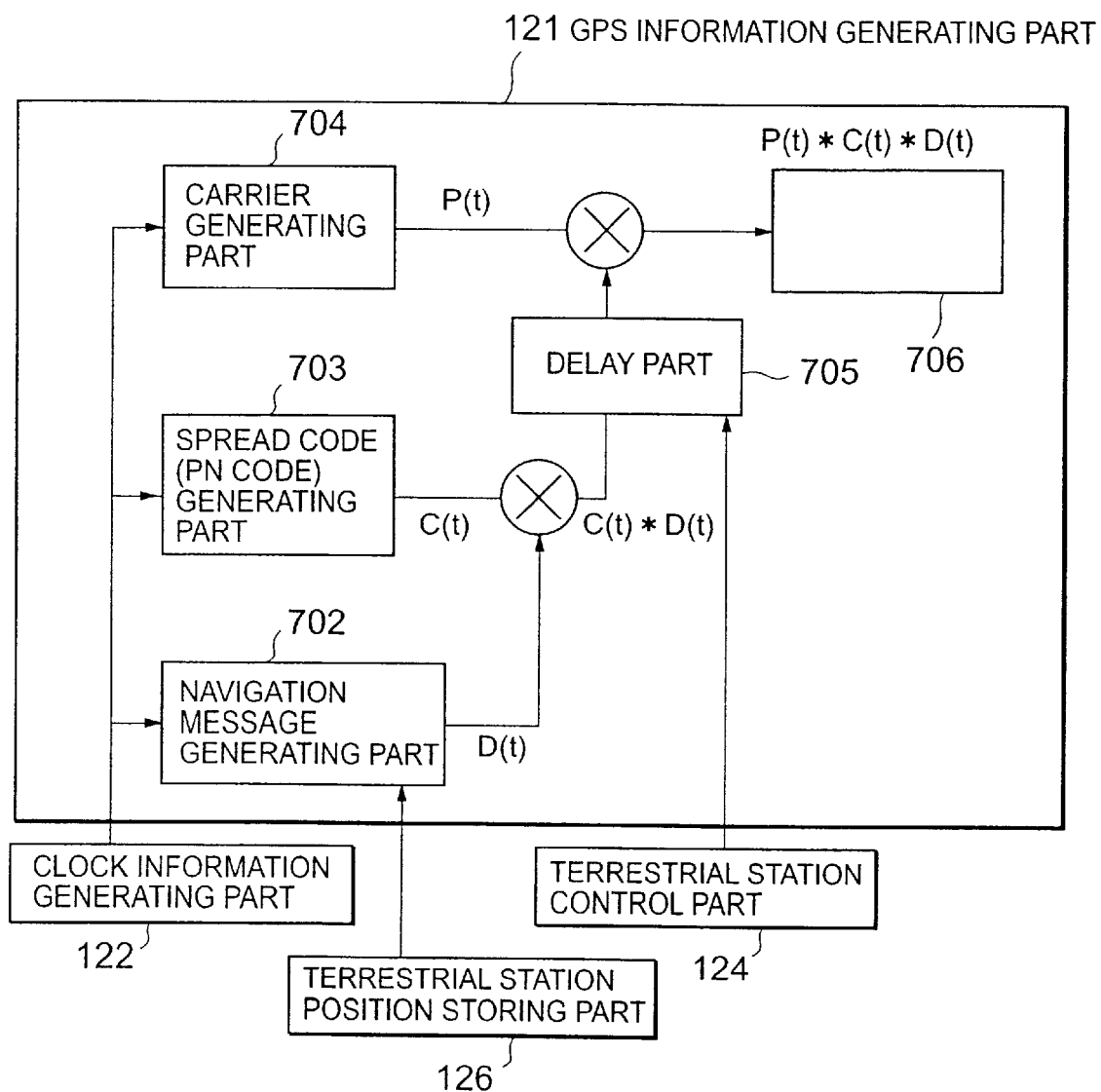
FIG. 7 is a block diagram showing a CPS information generating part.

Next, detailed operation of the above-mentioned GPS information generating part 121 will be described referring to FIG. 7.

Figure 8:
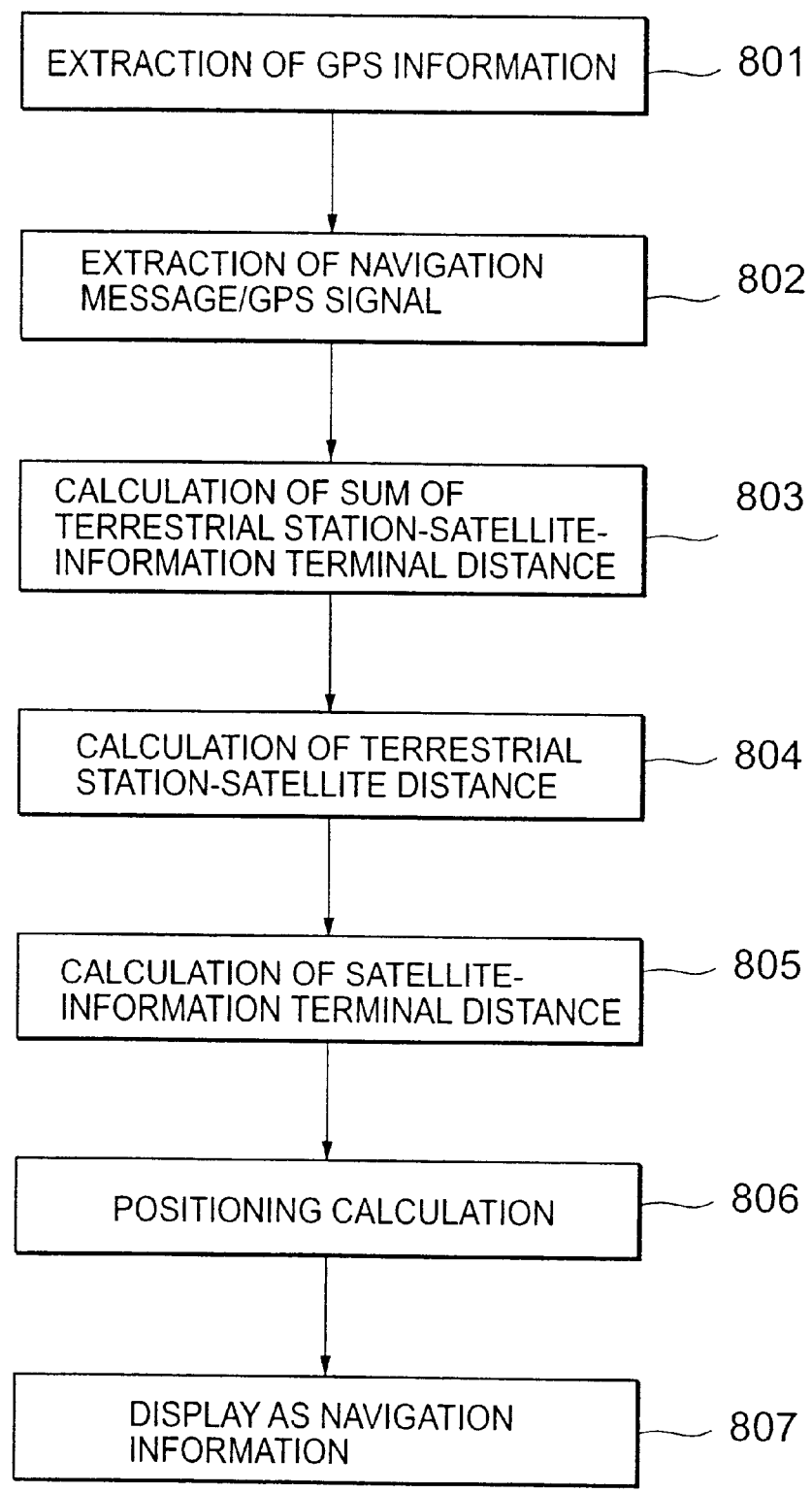
FIG. 8 is a flowchart showing processing performed by a mobile station.
Figure 11:
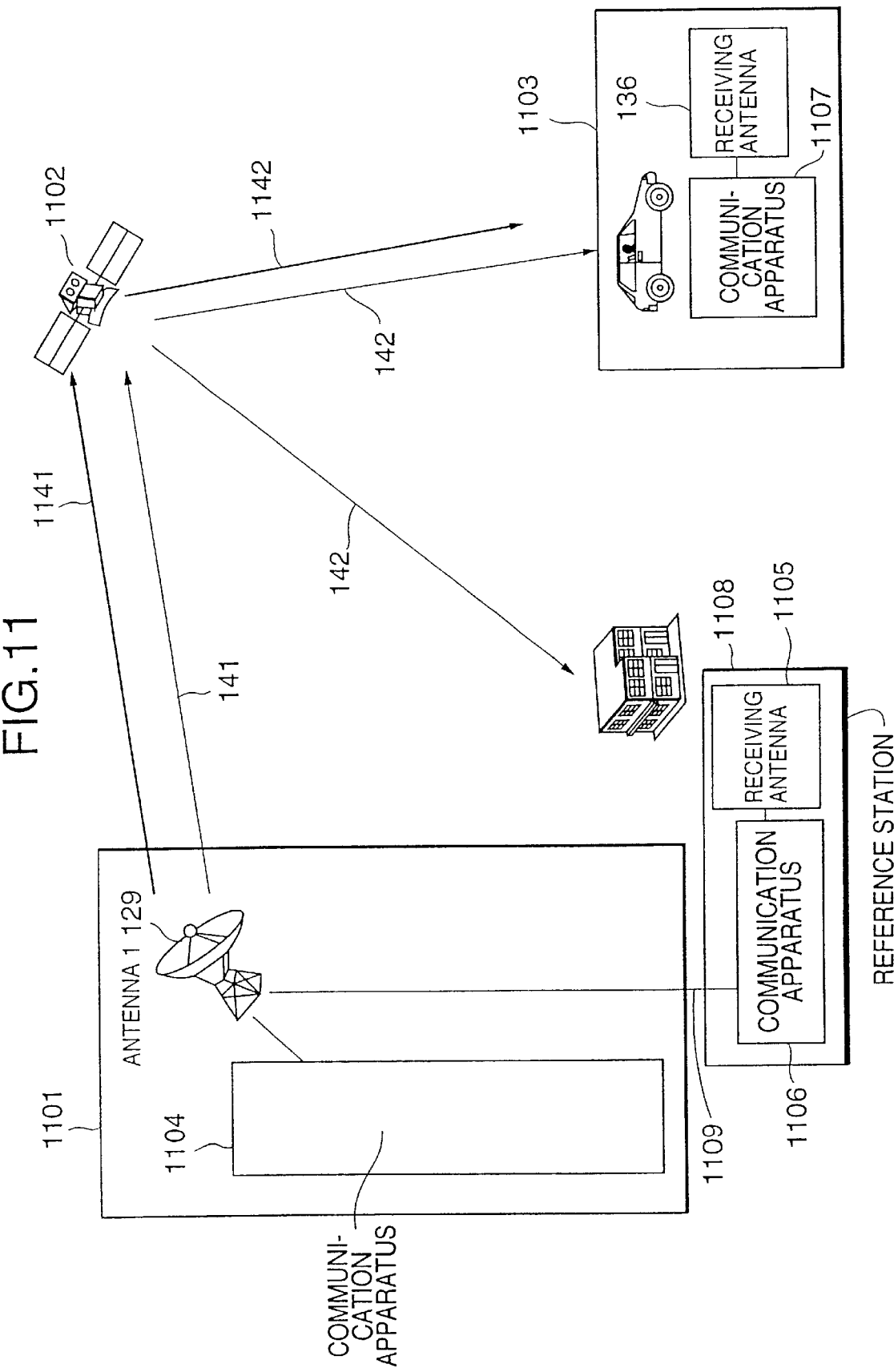
FIG. 11 is a diagram showing an entire system configuration according to another embodiment.

The GPS information generating part 121 comprises: a carrier generating part 704 for generating a carrier P(t) in accordance with a clock from the clock information generating part 122; a spread code generating part 703 for sequentially generating a GPS signal (spread code (PN code) C(t)) characteristic to each satellite, synchronously with the clock from the clock information generating part 122; a navigation message generating part 702 for repeatedly generating the navigation message shown in FIG. 6 synchronously with the clock information generating part 122; and a delay part 705 for calculating a delay time based on the distance between the terrestrial station 102 and each HEO satellite 101 and for generating a delay of the GPS signal corresponding to a difference from the periodic difference of the PN code to approximate the above-mentioned delay time as shown in FIG. 8.

The GPS information generating part 121 superimposes the GPS signal to the navigation message by using the spread code C(t) to spread a data sequence D(t) of the navigation message generated by the navigation message generating part 702.

Further, the carrier generating part 704 modulates the result of the superimposition to generate GPS information 141. At that time, the delay part 705 generates a delay to bring a delay of one period of the PN code, which can cancel the communication time error generated between the HEO satellite and the terrestrial station.

Thus, the GPS information 141 includes two signals, namely, the navigation message D(t) and the GPS signal obtained by superimposing the navigation message with the spread code C(t).

The below-described data separation part 133 within a mobile station and the data separation part 127 of the terrestrial station side system 102 perform the process of FIG. 7 reversely (except for the processing of the delay part 105) to obtain the GPS signal and the navigation message.

Figure 3:
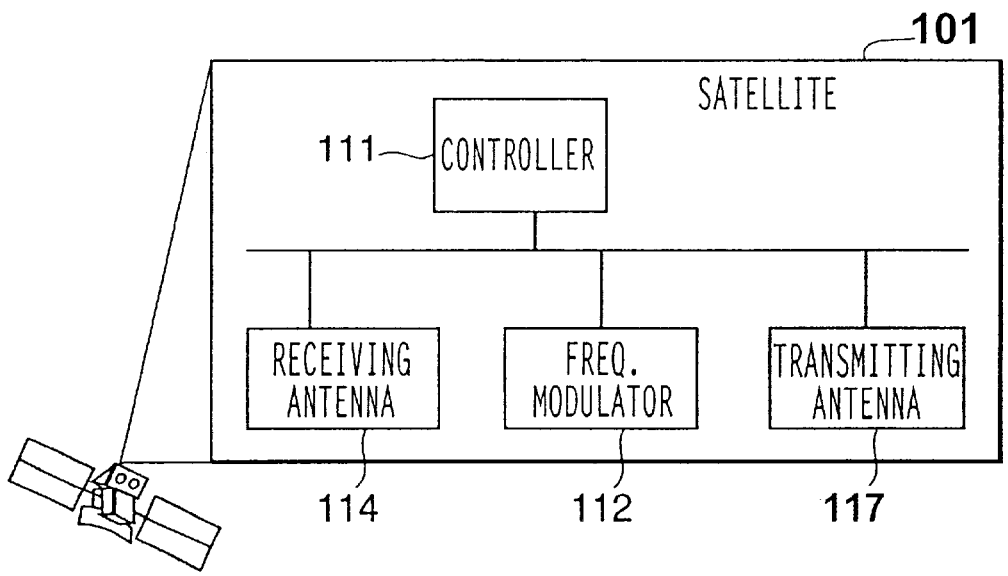
FIG. 3 is a block diagram showing an HEO satellite.
Figure 4:
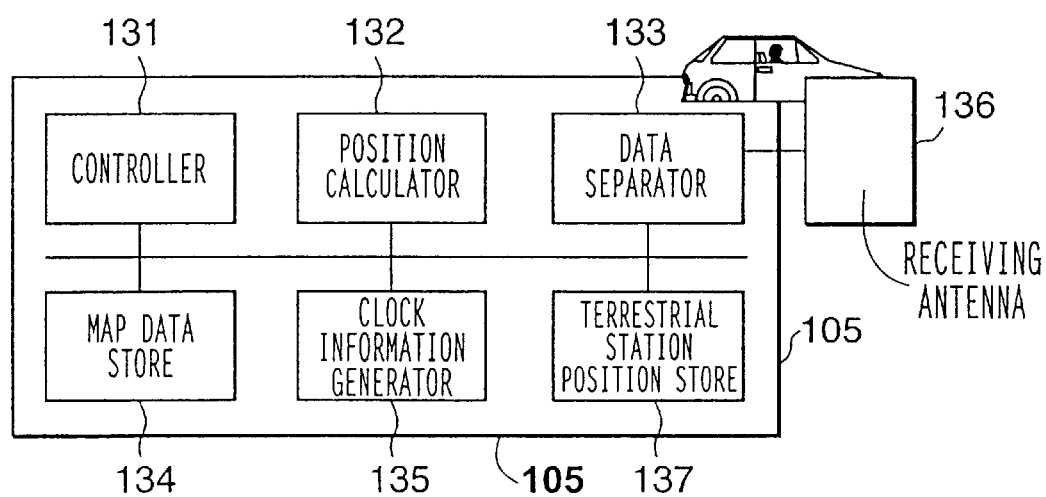
FIG. 4 is a block diagram showing a mobile station side system.

Namely, this GPS information 141 is demodulated with the spread code held for each satellite, to extract P(t), and to obtain the GPS signal C(t)D(t). Further, by extracting D(t) from the signal C(t)D(t) by low frequency band-pass corresponding to D(t), the information bit sequence P(t) of the navigation message shown in FIG. 3 is obtained.

By this, a mobile station 103 does not need to consider a transmission time discrepancy owing to a distance between the terrestrial station and each satellite, which is characteristic to a broadcast GPS. Namely, since a delay corresponding to a difference in a transmission time is previously generated before transmission that allows a time margin, it is possible to omit a discrepancy cancelling process after the reception that requires consideration of the real time property.

(2) Quasi-Zenithal Satellite (HEO Satellite)

An HEO satellite 101 comprises a satellite control part 111, a frequency modulator 112, a receiving antenna 114 for receiving GPS information 141 from a terrestrial station antenna 129, and a transmitting antenna 117. The satellite control part 111 controls the frequency modulator 112 to decode the navigation message from the GPS information 141 received through the receiving antenna 114, and modifies the orbit of the HEO satellite 101 based on the decoded navigation message. Further, the satellite control part 111 amplifies the signal of the received GPS information 141, and sends the amplified signal as the GPS information 142 to the transmitting antenna 117, to transmit the GPS information 142 toward the ground.

(3) Mobile Station (Mobile Station Side System)

A mobile station 103 comprises a receiving antenna 136 for receiving GPS information 141 from an HEO satellite 101, and an information terminal 105 with positioning function for performing positioning calculation to obtain its own position from the GPS information received through the receiving antenna.

The information terminal 105 comprises: a terminal control part 131 for controlling the other processing parts constituting the information terminal 105; a data separation part 133 for receiving GPS information 141 through the receiving antenna 136 to separate the navigation message and the GPS signal from the GPS information 141; a terrestrial station position information storing part 137 for storing terrestrial station position information, obtaining it from the navigation message separated by the data separation part 133; a position calculation part 132 for calculating the position from the terrestrial station position information obtained from the GPS signal and the navigation message separated by the data separation part 133; a map data storing part 134 for storing 3D map data including height information for navigation; a clock information generating part 135 for generating clock information expressing the present time; and the terrestrial station position information storing part 137 for storing the terrestrial station position information.

In the following, operation of the mobile station 103 will be described. A part of the operation is shown in FIG. 8.

The receiving antenna 136 receives the signal including the GPS information 142 from an HEO satellite 101, and delivers it to the data separation part 133 of the information terminal 105.

In the information terminal 105, the control part 131 makes the information terminal's components perform following processing.

The data separation part 133 separates the received signal to extract the GPS information 142. Further, by demodulating the GPS information 142 with the PN code assigned to each satellite, the data separation part 133 obtains the GPS signal and the navigation message (Process 801).

Further, the data separation part 133 decodes the navigation message (Process 802), and delivers the position information ($S_i$, $Y_i$, $Z_i$: i is a satellite number) of each HEO satellite 101 included in the navigation message to the GPS position calculation part 132. Further, the data separation part 133 extracts the distance ($B_i$; i is a satellite number) between the terrestrial station side system 102 and each HEO satellite 101 from the navigation message (or, extracts the terrestrial station position information and position information of each satellite, and then, obtained the distance based on a difference of those positions), and stores the distance into the terrestrial station position information storing part 136 (Process 803 and Process 804).

Further, the data separation part 133 generates an event to inform the on-board control part 131 about a timing at which the data separation part 133 receives the top bit of the GPS signal of the pseudo-noise which is repeated at constant intervals.

The on-board control part 131 receives the time when it is informed of the timing, from the clock information generating part 135, and set it into the GPS position calculation part 132.

The GPS position calculation part 132 calculates the present position of the information terminal based on the position information ($X_i$, $Y_i$, $Z_i$: i is a satellite number) of each HEO satellite 101 and the timing ($T_i$) of receiving the signal of each HEO satellite 101 received from the data separation part 133 or the on-board control part 131 (Process 805 and Process 806).

Namely, the GPS position calculation part 132 calculates a difference $T_i$ between a planned output timing (for example, every 10 msec) of the satellite 101, which is stored in the GPS position calculation part 132, and the observed signal receiving timing $T_i$. The position ($x_0$, $y_0$, $z_0$) and the time discrepancy ($t$) are obtained by the following method, based on this $T_i$, the position information ($X_i$, $Y_i$, $Z_i$: i is a satellite number) of each satellite, and the distance ($B_i$) between each satellite 101 and the GPS reference station, which is stored in the terrestrial station information storing part.

In one time three-dimensional positioning, satellite signals are received from four GPS satellites, respective distances between the observation point and positions of these four GPS satellites are obtained, and four simultaneous equations are set up to obtain a solution.

Further, in one time two-dimensional positioning, satellite signals are received from three GPS satellites, respective distances between the observation point and positions of these three GPS satellites are obtained, three simultaneous equations are set up, one equation relating to known values on the observation point is set up, and the four simultaneous equations consisting of those three equations and the one equation are solved using the least-squares method.

Namely, in the three-dimensional positioning in the X-Y-Z rectangular coordinate system having the center of the earth as the origin, expressing the position $P_0$ of the observation point as ($x_0$, $y_0$, $z_0$), the position $P_i$ if i-th (i=1, 2, 3, 4) GPS satellite as ($x_i$, $y_i$, $z_i$), a radio wave arriving time from the i-th GPS satellite as $T_i$, and a time error as t, the following equation is obtained.

$$\{(x_i-x_0)^2+(y_i-y_0)^2+(z_i-z_0)^2\}^{1/2}+B_i=c^*(T_i+t) \quad \text{(Eq. 1)}$$

Defining $R_i$ and s as $c^*T_i=R_i$ and $c^*_t=s$, we obtain:

$$\{(x_i-x_0)^2+(y_i-y_0)^2+(z_i-z_0)^2\}^{1/2}+B_i-s=R_i \quad \text{(Eq. 2)}$$

Since we have Eq. 2 for each of the four GPS satellite, the four unknowns $x_0$, $y_0$, $z_0$, and s can be obtained, which leads to a highly precise position $x_0$, $y_0$, $z_0$ of the observation point with the time error being corrected.

By performing a predetermined coordinate transformation, the longitude, latitude, and height of the observation point are obtained. Usually, however, one measurement produces an error. Accordingly, the GPS position calculation part performs observations using data of a plurality of times, and selects the solution having the least variance among the values as the satellite position to return to the on-board control part.

When it is impossible to see four or more satellites in the shadow of a building for example, the satellite position calculation part performs two-dimensional observation using already-obtained measurements and height information h within the map data storing part.

In the two-dimensional positioning, Eq. 1 is set up for three GPS satellites (i=1, 2, 3). And, adding the following equation Eq. 3:

$$(x_0^2+y_0^2+z_0^2)^{1/2}=h \quad \text{(Eq. 3)}$$

to those three equations, the four unknowns $x_0$, $y_0$, $z_0$, s are solved, which leads to a highly precise position $x_0$, $y_0$, $z_0$ with the time error being corrected. By performing predetermined coordinate transformation, the longitude, latitude, and height of the observation point are obtained.

Further, the GPS position calculation part 132 refers to the map data using the calculated position data ($x_0$, $y_0$), compares the height data of that longitude and latitude with the calculated height data. When the difference between those height data is more than a predetermined value, the GPS position calculation part 132 calculates new height information again. This calculation is repeated until the difference between the calculated result and the height information in the map data is less than or equal to the predetermined value.

In the satellite NAVSTAR used in the conventional GPS system, satellites fly longitudinally and latitudinally in the sky. On the other hand, quasi-zenithal satellites have apparently one limited orbit seen from the ground, and it is difficult to attain precision with a small number of satellites. However, when five quasi-zenithal satellites are used as in the present invention, Geometrical Dilution Of Precision (GDOP), which also becomes a problem as an error of positioning, can be made less than or equal to 10.

With respect to this GDOP, when four satellites are used to decide the position (x, y, z, t) of a moving object, an error generated owing to positions of the satellites is obtained by Eq. 4.

$$A = \begin{bmatrix} x_1 & y_1 & z_1 & 1 \\ x_2 & y_2 & z_2 & 1 \\ x_3 & y_3 & z_3 & 1 \\ x_4 & y_4 & z_4 & 1 \end{bmatrix} \quad \text{Eq. 4}$$

$$GDOP = \sqrt{Trace((^tAA)^{-1})}$$

When GDOP is calculated using another embodiment where the kind of satellites is modified from the above embodiment, the result is shown in FIG. 9.

FIG. 10 shows apparent positions of an HEO satellite 101 seen in Tokyo according to each embodiment. In FIG. 10, numbers in the column of Satellite position show positions at intervals of one hour, and the number 0 indicates the case where the satellite exists at the azimuth of 184 degrees and the elevation angle of 0.7 degrees from Tokyo at 0000 hour. For example, the number 14 with respect to the quasi-zenithal satellite means the position at 14:00 hours.

From the result of FIG. 9, the following can be seen.

When four quasi-zenithal satellites are operated in a 6 hour cycle, GDOP becomes more than 14, and, in a certain case, a large number such as 375, which is unsuitable for positioning.

On the other hand, when one satellite is added to realize a five-satellite system (in an about 5 hour cycle), the result is largely improved to have the worst GDOP of 9.5. Further, in a six-satellite system, GDOP is improved to 8.0. Further, when a geostationary satellite of NSTAR is added to a system of four HEO satellites, GDOP becomes largely improved to the worst of 7.6. As a result, it is found that, by adding an HEO satellite or another type of satellite to four HEO satellites, the resultant satellite arrangement gives a GDOP value usable for positioning. Further, even in a three-HEO-satellite system, GDOP can be improved by adding geostationary satellites. For example, when an NSTAR satellite is added, in the case of an HEO satellite orbit, GDOP can be made a value of practical use of less than or equal to 10 by arranging five or more satellites at generally uniform intervals on the orbit.

Further, other experiments show the following results.

By using three out of six quasi-zenithal satellites arranged at generally uniform intervals, and using, in addition, a satellite that is not quasi-zenithal (for example, JCSAT4), GDOP can be made less than or equal to 10.

Further, using three out of four quasi-zenithal satellites arranged at generally uniform intervals, and using, in addition, a satellite that is not quasi-zenithal (for example, JCSAT4), GDOP can be made less than or equal to 11.

Further, using six quasi-zenithal satellite arranged at generally uniform intervals, and using, in addition, two satellites that are not quasi-zenithal (for example, JCSAT4), GDOP can be made less than or equal to 8.

Thus, when positions of quasi-zenithal satellites are used for positioning, it is possible to realize positioning accuracy or GDOP 10 or less using a small number of satellites such as about five satellites.

Next, another embodiment of the present invention will be described.

This system transmits GPS information using a broadcast function of an HEO satellite, and at the same time, transmits differential information from the HEO satellite. By this, one antenna can receive not only the GPS information 141 but also DGPS information 1141 as shown in Fib.11.

This system is characterized in that it is provided with a plurality of GPS reference station 1108 each having the same function as a mobile station 1103 and receiving GPS information.

Each reference station 1108 comprises: a receiving antenna 1105 for receiving a signal that includes GPS information 142 transmitted from an HEO satellite 1102; and a reference station communication apparatus 1106.

Figure 13:
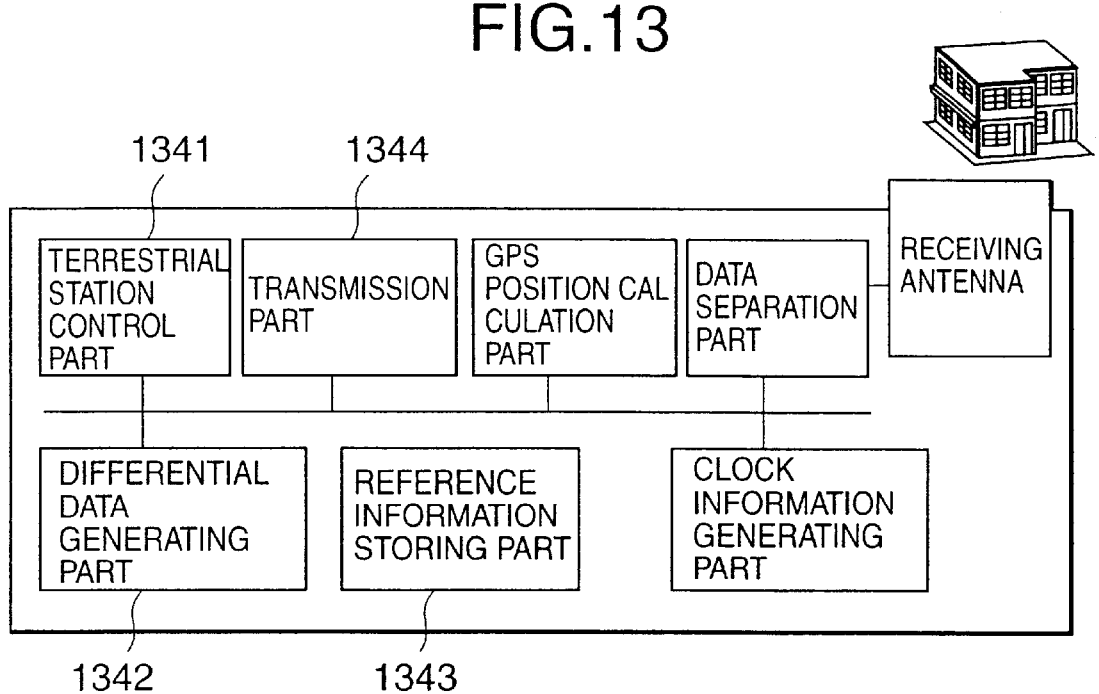
FIG. 13 is a diagram showing a configuration of the reference station side system of FIG. 11.

As shown in FIG. 13, this reference station communication apparatus 1106 has a configuration similar to one of the communication apparatus 105 of a mobile station 103 of FIG. 1 except that it does not have the map data134, that it is provided with a differential data generating part 1342 for generating differential data used for correcting positioning information based on information of the GPS position calculation part, a reference information storing part 1343, a transmission part 1344 for transmitting the generated differential data to the GPS terrestrial station, and that it is provided with a reference station control part 1341 instead of the mobile station control part 131.

When the reference station 1108 receives a signal including GPS information 142 through the receiving antenna 1206, the data separation part separates the signal into GPS information 142 from each HEO satellite 101, to obtain a GPS signal.

Further, the position calculation part calculates the position of the reference station 1108 based on the separated GPS signal and present time information from the clock information generating part.

Further, the reference station control part 1341 calculates a discrepancy from the information measured by the GPS signal, based on the position information from the position calculation part and the reference station position in the reference information storing part 1343.

The differential data generating part 1342 gives the reference station's characteristic number to the information of the position discrepancy and a time error from the position calculation part, and transmits the resultant data as differential data to the GPS terrestrial station through the transmission part 1344 and the network.

At that time, as the discrepancy, may be used (X, Y, Z, T) for each satellite, or a pair of the distance difference and time discrepancy (R, T).

Figure 12:
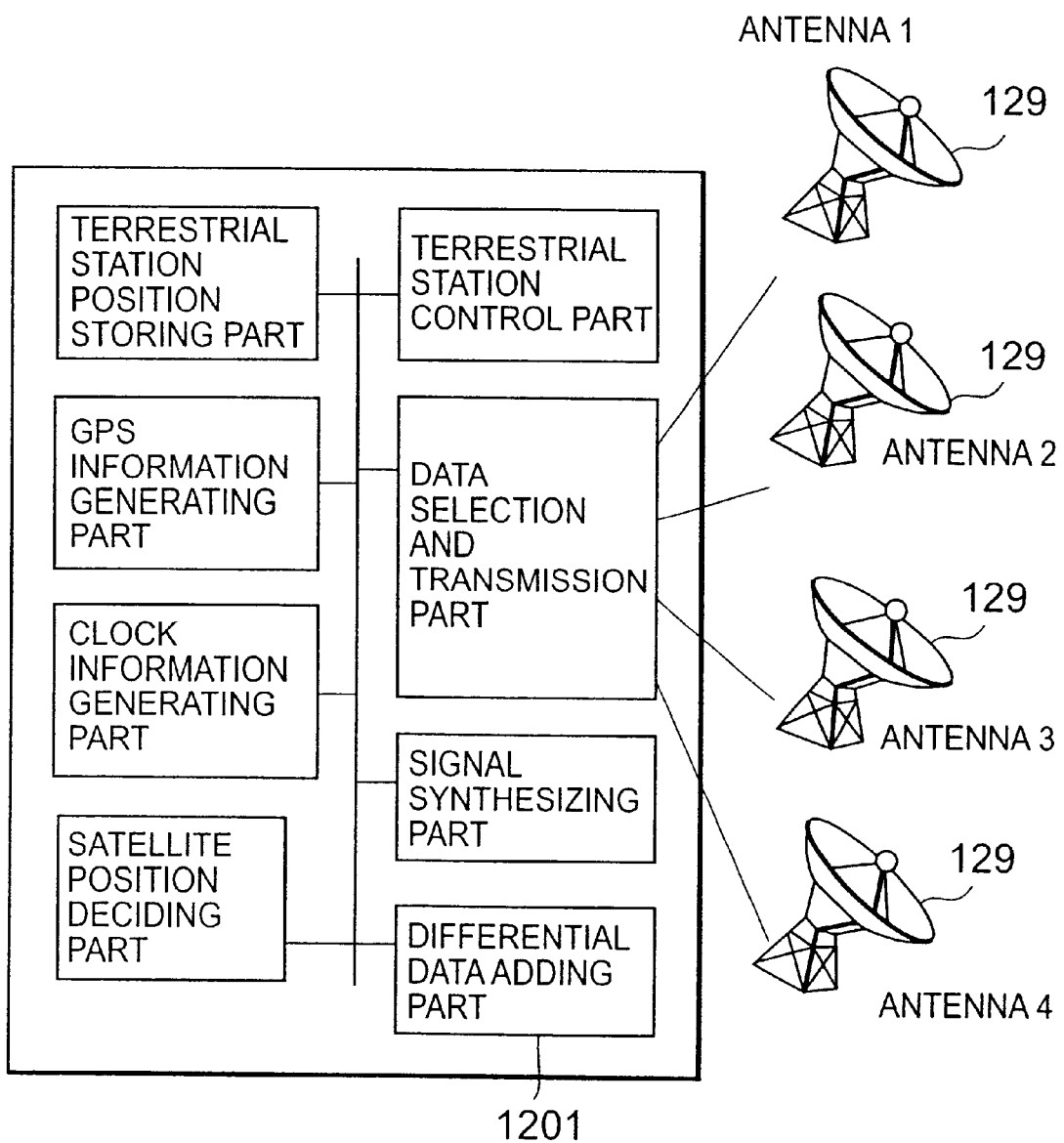
FIG. 12 is a diagram showing a configuration of the terrestrial station side system of FIG. 11.

As shown in FIG. 12, the terrestrial station has a configuration in which a differential data adding part 1201 is added to the terrestrial station of FIG. 1.

The differential data adding part 1201 receives differential data from a plurality of reference stations 1108, and transmits the received data as DGPS information to the HEO satellite 101.

Receiving the DGPS information, the HEO satellite 101 transmits it at a predetermined frequency toward the ground through the transmitting antenna, after frequency modulation if necessary.

Figure 14:
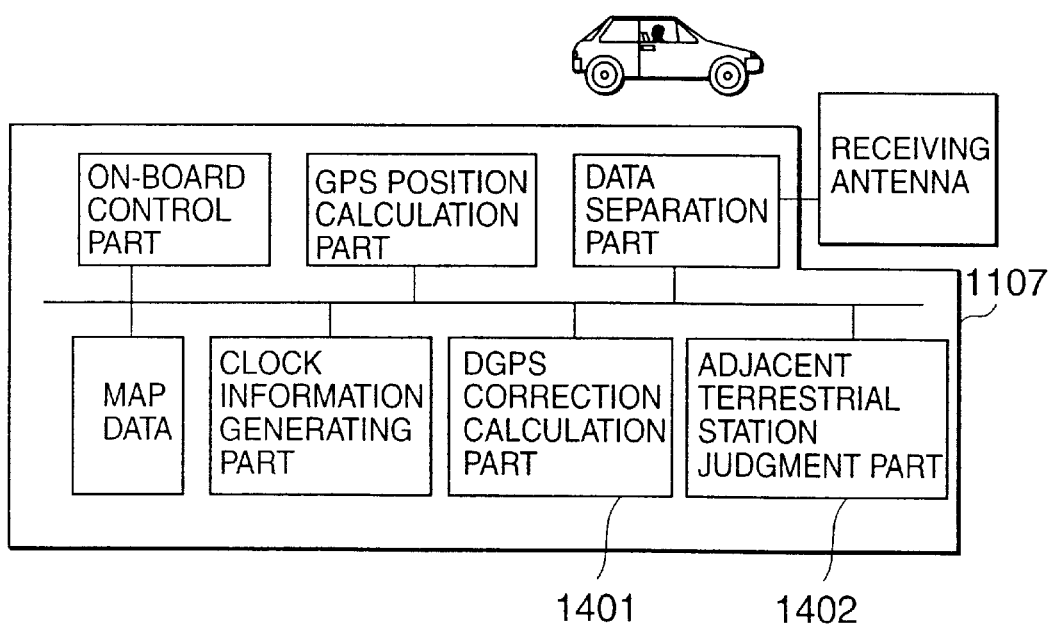
FIG. 14 is a diagram showing a configuration of the mobile station side system of FIG. 11.

As shown in FIG. 14, the mobile station 1103 is newly added with a DGPS correction calculation part 1401 and an adjacent terrestrial station judgment part 1402, in comparison with the mobile station of FIG. 1.

In the present embodiment, when the DGPS information 1142, which has been modulated with a predetermined frequency and a spread code, is received through the antenna receiving part 136, the data separation part separates the received information.

The on-board control part obtains the DGPS information 1142 of the nearest GPS reference station, using the reference station position information in the separated GDPS information 1142 and first approximation position obtained from the GPS position calculation part, and sets the obtained DGPS information 1142 to the DGPS correction calculation part 1401.

Further, the position calculation part calculates its own position again.

At this time, however, the calculation is performed as in Eq. 5 using discrepancy information for each satellite.

$$\{(x_i-x_0)^2+(y_i-y_0)^2+(z_i-z_0)^2\}^{1/2}+B_i=C'(T_i-T+_i)-R \quad \text{(Eq. 5)}$$

where (R, T) is the discrepancy information of the satellite concerned.

Namely, the GPS position calculation part refers to the DGPS information of the nearest GPS reference station in the DGPS correction calculation part 1401, and subtracts the discrepancy measured by the reference station from each position data calculated, to obtain the real position.

Figure 15:
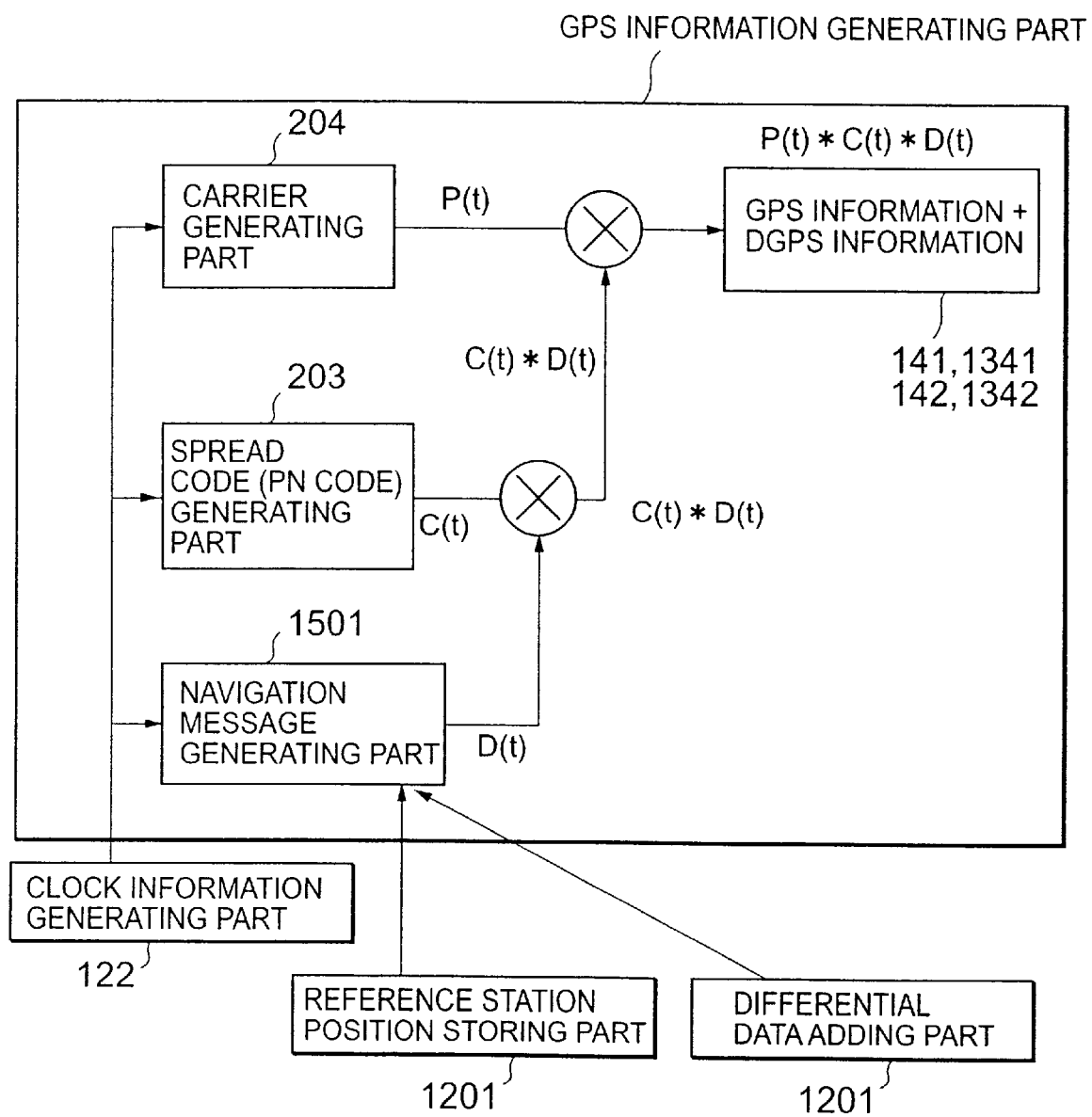
FIG. 15 is a block diagram showing the GPS information generating part of FIG. 12.
Figure 18:
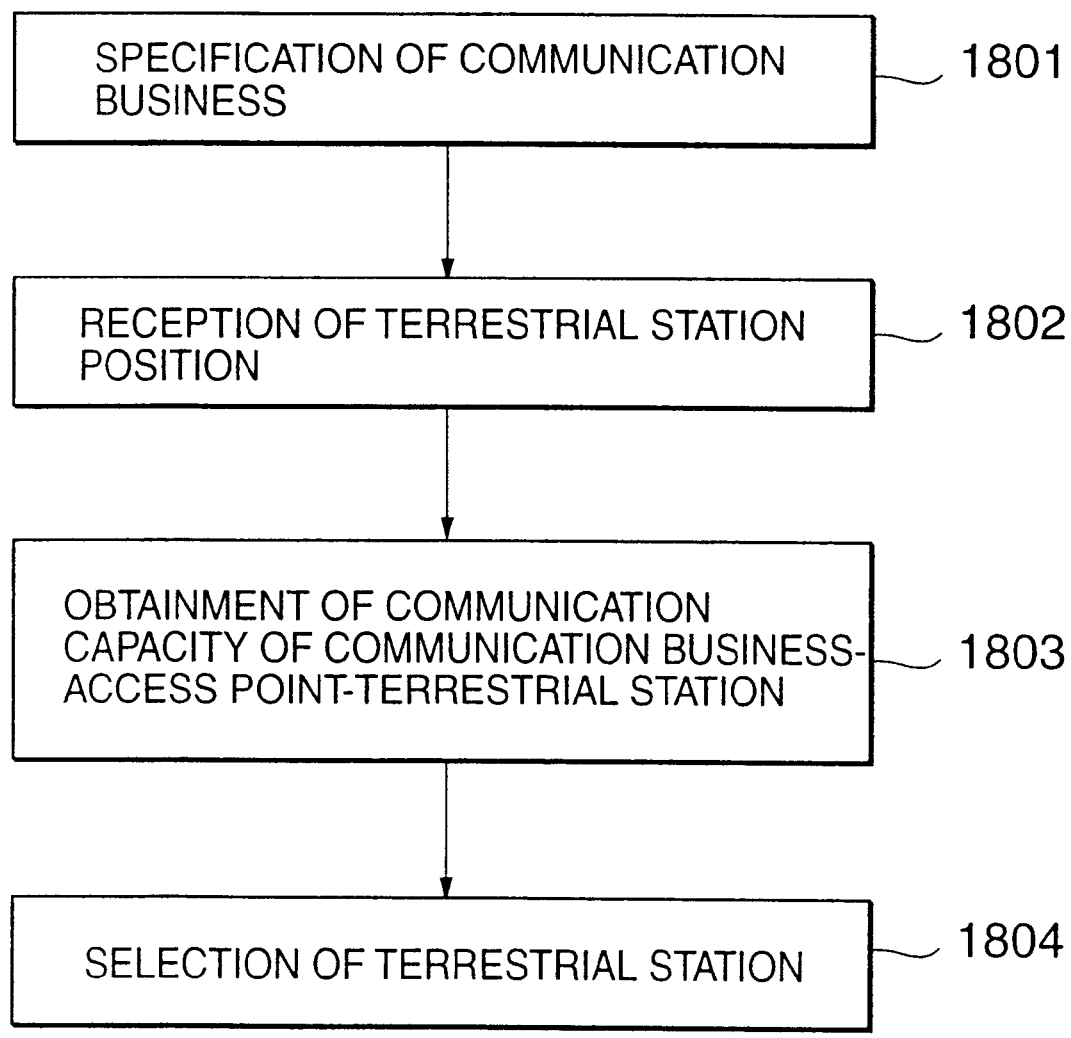
FIG. 18 is a flowchart showing processing performed by the mobile station side system of FIG. 17.

FIG. 15 shows the GPS information generating part according to the present embodiment.

In this example, the DGPS information shown in FIG. 16 is added after the navigation message and transmitted as the data in the GPS information.

As shown in FIG. 16, DGPS information has a message header for synchronization similar to the navigation message, a message type (in this case, 2 indicating DGPS information) showing a kind of the message, and thereunder, the number of the reference stations, and for each reference station, a reference station identification number, reference station position information, the number of satellites seen from the reference station, and for each satellite, a satellite number, a correction value for a pseudo distance, a correction value for a distance change rate, and a data issue number indicating date measurement time. The mobile station distinguishes between a navigation message and DGPS information, based on the message type shown in FIG. 16.

Conventionally, the differential GPS has been realized using a plurality of media or antennas. Using the present system, however, it is possible to establish a three-dimensional positioning system in which one antenna receives GPS positioning information and differential information for making the GPS positioning information more precise.

Here, will be described a system for communication with a communication business, using the positioning system of the present invention FIG. 17 shows a system configuration of the present embodiment.

The system of the present embodiment comprises five quasi-zenithal satellites (hereinafter, referred to as HEO satellites) 101, terrestrial station antennas 129, a terrestrial station side communication system 1700, a mobile station side communication apparatus 1709, an access point 1703, and a telecommunication business side system 1704.

An HEO satellite 101 has the same configuration as the HEO satellite 101 of FIG. 1.

The terrestrial station side system 1700 has a configuration generally similar to the communication apparatus 104 of FIG. 1, except that a communication apparatus 1702 for controlling a communication line with the access point 1703 is provided. Further, the access point 1703 is connected to the communication apparatus 1705 of the telecommunication business 1704 that performs Internet connection and the like. Further, it is assumed that a plurality of such terrestrial side systems 102 are provided.

Further, the mobile station side communication apparatus 1709 has a configuration that is obtained by adding a terrestrial station selecting part 1706, a terminal control part 1707, and a communication capacity storing part 1708 to the configuration of the mobile station side communication apparatus 105 of FIG. 1.

First, a user makes input specifying a communication business into the mobile station side communication apparatus 1709 as an information terminal of the mobile station side system 103. When the information terminal receives that input, searches and specifies the terrestrial station side system whose line is connected to the specified communication business (Process 1801).

The position of the terrestrial station side system used for positioning is obtained from the terrestrial station position information storing part 137 (Process 1802).

Communication capacity between the communication business 1704 or the access point 1703 and the terrestrial station side communication system 1700 is obtained from the communication capacity storing part 1708 (Process 1803).

Next, the terrestrial station selecting part 1706 obtains the communication capacity of the communication line between the communication business 1704 or the access point 1703 and each terrestrial station 101, and selects the terrestrial station side system connected to the communication line having the largest communication capacity (Process 1804).

By selecting the terrestrial station side system to connect, using the positions of the terrestrial station side systems used for positioning, it is possible to select the communication line having the largest communication capacity between the communication business 1704 or the access point 1703 and the terrestrial station 101. Accordingly, it is possible to shorten the communication time between the information terminal and the communication business, and improvement of the communication speed. Also, from the viewpoint of the user of the information terminal, a communication charge can be reduced by shortening the communication time.

While we have shown and described the embodiments according to our invention, it should be understood that the disclosed embodiments are susceptible of changes and modifications without departing from the scope of the invention. Therefore, we do not intend to be bound by the details shown and described herein, but intend to cover all such changes and modifications falling within the ambit of the appended claims.

What is claimed is:

1. A positioning system comprising:

a terrestrial station side system, which comprises a terrestrial station side satellite communication antenna for transmitting a signal to a satellite and a terrestrial station side communication apparatus for transmitting the signal to said terrestrial station side satellite communication antenna;

said satellite having a satellite side satellite communication antenna for performing transmission and reception to and from a ground; and a mobile station side system, which comprises a mobile station side satellite communication antenna for receiving said signal from the satellite, and an information terminal for measuring a position where the mobile station side system exists, based on the signal received through said mobile station side satellite communication antenna; wherein:

said information terminal comprises:

a first extractor which extracts a distance between the position where said terminal station side system exists and said satellite, from the signal transmitted from said satellite;

a second extractor which extracts a transmission time from said signal transmitted from said satellite;

a summary unit which obtains a sum of the distance between said terrestrial station side system and the satellite and a distance between said satellite and the mobile station side system, based on a difference between said transmission time extracted and a reception time of said signal in said mobile station side system;

a distance unit which obtains the distance between said mobile station side system and said satellite, by subtracting the distance between said terrestrial station side system and said satellite from said sum; and a position unit which obtains the position where said mobile station side system exists, based on the obtained distance between said mobile station side system and said satellite.

2. The positioning system according to claim 1, wherein:
the signal transmitted from said satellite includes a navigation message; and
said navigation message includes the information indicating position where said terrestrial station side system exists and a position of said satellite.

3. The positioning system according to claim 1, comprising:
three or more quasi-zenithal satellites as said satellite.

4. The positioning system according to claim 2, comprising:
three or more quasi-zenithal satellites as said satellite.

5. The positioning system according to claim 3, wherein:
a number of said quasi-zenithal satellites included in the positioning system is four or more.

6. The positioning system according to claim 4, wherein:
a number of said quasi-zenithal satellites included in the positioning system is four or more.

7. The positioning system according to claim 5, wherein:
a number of said quasi-zenithal satellites included in the positioning system is five or more.

8. The positioning system according to claim 6, wherein:
a number of said quasi-zenithal satellites included in the positioning system is five or more.

9. The positioning system according to claim 3, wherein:
each of said quasi-zenithal satellites is an HEO satellite.

10. The positioning system according to claim 4, wherein:
each of said quasi-zenithal satellites is an HEO satellite.

11. The positioning system according to claim 5, wherein:
each of said quasi-zenithal satellites is an HEO satellite.

12. The positioning system according to claim 6, wherein:
each of said quasi-zenithal satellites is an HEO satellite.

13. The positioning system according to claim 7, wherein:
each of said quasi-zenithal satellites is an HEO satellite.

14. The positioning system according to claim 8, wherein:
each of said quasi-zenithal satellites is an HEO satellite.

15. An information terminal, comprising:
a first extractor which extracts a distance between a terrestrial station side system and a satellite, from a signal transmitted from said satellite;
a second extractor which extracts a transmission time from said signal transmitted from said satellite;
a summary unit which obtains a sum of the distance between said terrestrial station side system and said satellite and a distance between said satellite and a mobile station side system, based on a difference between said transmission time extracted and a reception time of said signal received by said mobile station side system;
a distance unit which obtains the distance between said mobile station side system and said satellite, by subtracting the distance between said terrestrial station side system and said satellite from said sum; and
a position unit which obtains a position where said mobile station side system exists, based on the obtained distance between said mobile station side system and said satellite.

16. The information terminal according to claim 15, wherein:
said distance between said terrestrial station side system and said satellite is included in a navigation message included in said signal.

17. The information terminal according to claim 16, wherein:
said satellite is each of three of more quasi-zenithal satellites.

18. The information terminal according to claim 17, wherein:
a number of said quasi-zenithal satellites is four or more.

19. The information terminal according to claim 18, wherein:
a number of said quasi-zenithal satellites is five or more.

20. The information terminal according to claim 17, wherein:
each of said quasi-zenithal satellites is an HEO satellite.

21. The information terminal according to claim 18, wherein:
each of said quasi-zenithal satellites is an HEO satellite.

22. The information terminal according to claim 19, wherein:
each of said quasi-zenithal satellites is an HEO satellite.

23. A method of positioning comprising steps of:
extracting a distance between a terrestrial station side system and a satellite, from a signal transmitted from said satellite;
extracting a transmission time from said signal transmitted from said satellite;
obtaining a sum of the distance between said terrestrial station side system and the satellite and a distance between said satellite and a mobile station side system, based on a difference between said transmission time extracted and a reception time of said signal received by said mobile station side system;
obtaining the distance between said mobile station side system and said satellite, by subtracting the distance between said terrestrial station side system and said satellite from said sum; and
obtaining a position where said mobile station side system exists, based on the obtained distance between said mobile station side system and the satellite.

24. A computer readable storage medium holding a program to be executed by a computer to perform a positioning method, said positioning method comprising steps of:
extracting a distance between a terrestrial station side system and a satellite, from a signal transmitted from said satellite;
extracting a transmission time from said signal transmitted from said satellite;
obtaining a sum of the distance between said terrestrial station side system and the satellite and a distance between said satellite and a mobile station side system, based on a difference between said transmission time extracted and a reception time of said signal received by said mobile station side system;
obtaining the distance between said mobile station side system and said satellite, by subtracting the distance between said terrestrial station side system and said satellite from said sum; and
obtaining a position where said mobile station side system exists, based on the obtained distance between said mobile station side system and the satellite.

25. A computer program product comprising:
a computer readable program code means for extracting a distance between a terrestrial station side system and a satellite, from a signal transmitted from said satellite;
a computer readable program code means for extracting a transmission time from said signal transmitted from said satellite;

a computer readable program code means for obtaining a sum of the distance between said terrestrial station side system and the satellite and a distance between said satellite and a mobile station side system, based on a difference between said transmission time extracted and a reception time of said signal received by said mobile station side system;

a computer readable program code means for obtaining the distance between said mobile station side system and said satellite, by subtracting the distance between said terrestrial station side system and said satellite from said sum; and a computer readable program code means for obtaining a position where said mobile station side system exists, based on the obtained distance between said mobile station side system and the satellite.

\* \* \* \* \*